United States Patent
Saito

(10) Patent No.: US 11,487,481 B2
(45) Date of Patent: Nov. 1, 2022

(54) PRINTER, COMPUTER-READABLE MEDIUM, AND COMMUNICATION SYSTEM TO COMMUNICATE WITH MULTIPLE DEVICES INDEPENDENTLY

(71) Applicant: SATO HOLDINGS KABUSHIKI KAISHA, Tokyo (JP)

(72) Inventor: Koichi Saito, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 17/189,619

(22) Filed: Mar. 2, 2021

(65) Prior Publication Data

US 2021/0181998 A1 Jun. 17, 2021

Related U.S. Application Data

(63) Continuation of application No. 16/611,261, filed as application No. PCT/JP2018/025455 on Jul. 5, 2018, now Pat. No. 10,970,005.

(30) Foreign Application Priority Data

Jul. 31, 2017 (JP) .................................. 2017-147865

(51) Int. Cl.
*G06F 3/12* (2006.01)
*H04W 88/16* (2009.01)

(52) U.S. Cl.
CPC .......... *G06F 3/1204* (2013.01); *G06F 3/1231* (2013.01); *G06F 3/1284* (2013.01); *G06F 3/1292* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2006/0072151 A1 | 4/2006 | Amani et al. | |
| 2010/0054222 A1 | 3/2010 | Rune | |
| 2011/0134843 A1 | 6/2011 | Noldus et al. | |
| 2013/0063763 A1 | 3/2013 | Tse et al. | |
| 2013/0107316 A1 | 5/2013 | Kwon | |
| 2013/0110995 A1 | 5/2013 | Kwon | |
| 2015/0355872 A1 | 12/2015 | Oshiumi | |

FOREIGN PATENT DOCUMENTS

| | | |
|---|---|---|
| JP | 2009-182526 A | 8/2009 |
| WO | WO 2008/060208 A1 | 5/2008 |
| WO | WO 2009/142473 A1 | 11/2009 |

OTHER PUBLICATIONS

Extended European Search Report, Application No. 18841787.7, dated Jun. 23, 2020, 9 pages.

*Primary Examiner* — Thomas D Lee
(74) *Attorney, Agent, or Firm* — Foley & Lardner LLP

(57) ABSTRACT

A printer according to an embodiment includes: a communication unit configured to perform communication based on a first gateway and a second gateway; and a control unit configured to control the communication unit to perform the communication through the first gateway in communication with a first device connected to a mobile communication network and to perform the communication through the second gateway in communication with a second device connected to a LAN. The control unit is configured to control the communication unit such that the communication with the first device and the communication with the second device are performed independently from each other.

16 Claims, 8 Drawing Sheets

Figure 4:
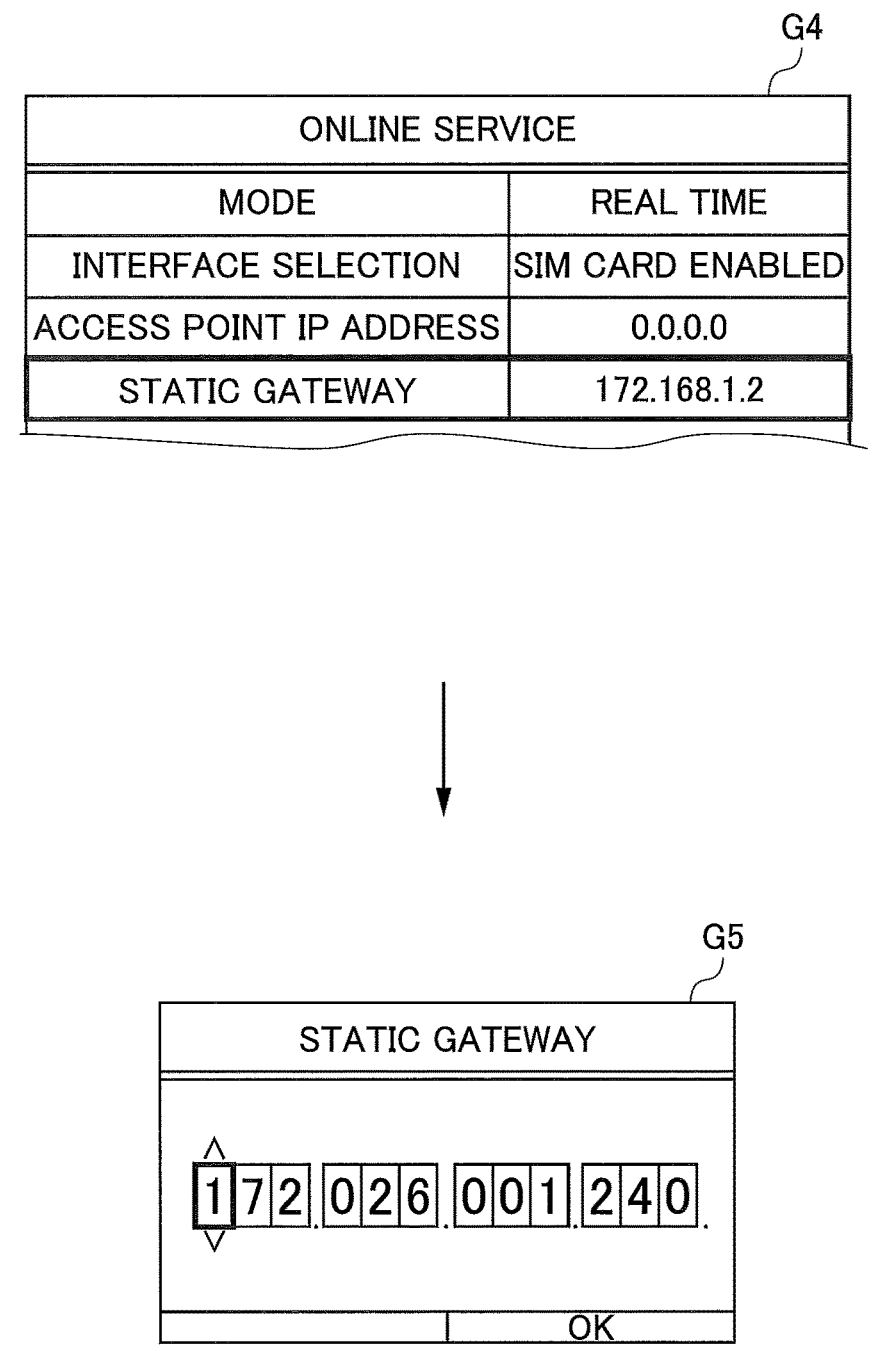

G4

| ONLINE SERVICE | |
|---|---|
| MODE | REAL TIME |
| INTERFACE SELECTION | SIM CARD ENABLED |
| ACCESS POINT IP ADDRESS | 0.0.0.0 |
| STATIC GATEWAY | 172.168.1.2 |

G5

STATIC GATEWAY

| 1 | 7 | 2 | . | 0 | 2 | 6 | . | 0 | 0 | 1 | . | 2 | 4 | 0 |

DATA TRANSMISSION PROCESS

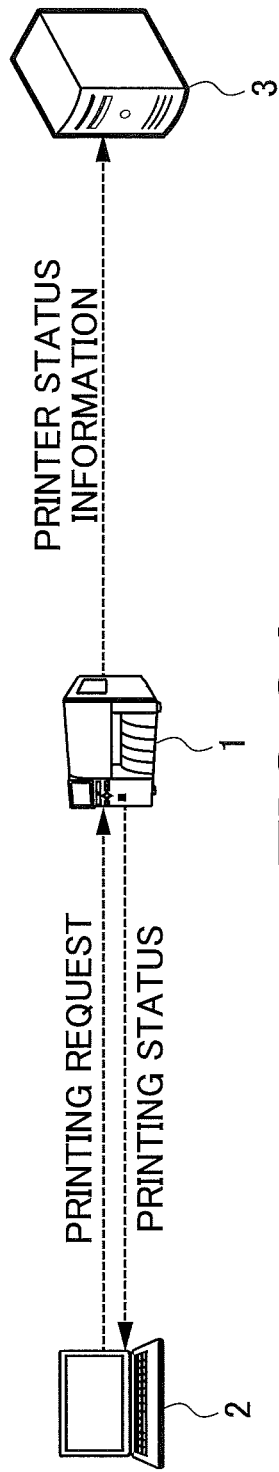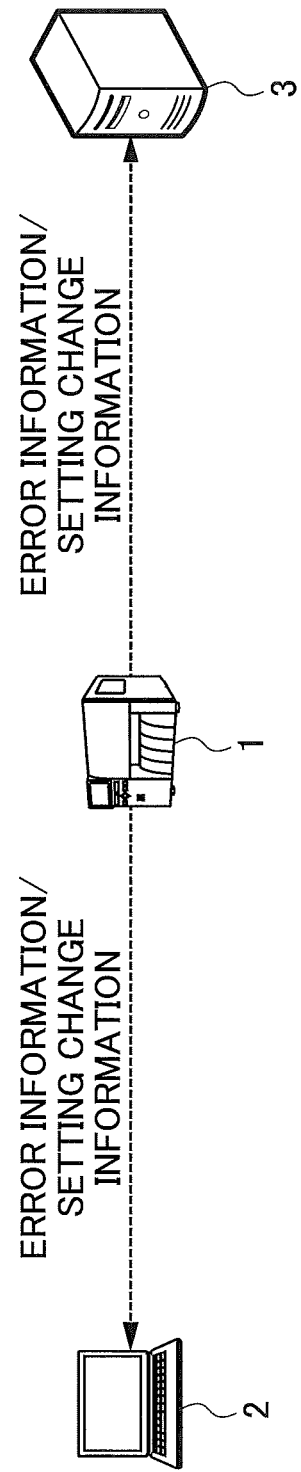

PRINTER, COMPUTER-READABLE MEDIUM, AND COMMUNICATION SYSTEM TO COMMUNICATE WITH MULTIPLE DEVICES INDEPENDENTLY

CROSS REFERENCE TO RELATED APPLICATIONS

This application is a continuation application of U.S. application Ser. No. 16/611,261, filed Nov. 6, 2019, which is the National Stage of Application No. PCT/JP2018/025455 filed on Jul. 5, 2018, which is based upon and claims the benefit of priority from Japanese Application No. 2017-147865, filed Jul. 31, 2017, the entire contents of all of which are incorporated herein by reference.

The present invention relates to a printer, a program for controlling communication of the printer, and a communication system including the printer.

BACKGROUND ART

There has been conventionally known a technology configured to detect a line or device failure in a network and switch between communication routes (see e.g., Japan Laid-open Patent Application Publication No. 2009-182526).

SUMMARY OF THE INVENTION

Problems to be Solved by the Invention

Incidentally, chances are that a user identification module (e.g., a SIM (Subscriber Identification Module) card), storing a user ID for using a mobile communication network, is set in a printer and steady communication is performed between the printer and an external server. In this case, a default gateway of the printer is set to use the mobile communication network. This poses a drawback that the printer cannot simultaneously perform communication with the aforementioned external server and that with another device connected to an external network existing outside a network to which the printer belongs.

In view of the above, it is an object of the present invention to enable a printer to simultaneously perform communication with an external device through a mobile communication network and that with a device connected to an external LAN.

Means for Solving the Problems

An embodiment of the present invention is a printer including: a communication unit configured to perform communication based on a first gateway and a second gateway; and a control unit configured to control the communication unit to perform the communication through the first gateway in communication with a first device connected to a mobile communication network and to perform the communication through the second gateway in communication with a second device connected to a local area network (LAN), wherein the control unit is configured to control the communication unit such that the communication with the first device and the communication with the second device are performed independently from each other.

Effect of the Invention

According to the aspect of the present invention, the printer is enabled to simultaneously perform communication with the external device through the mobile communication network and that with the device connected to the external LAN.

BRIEF DESCRIPTION OF THE DRAWINGS

FIG. 4 is a diagram showing an example of change in screen on the display panel of the printer according to the embodiment.

FIG. 8 is composed of FIGS. 8A and 8B that exemplify configurations, respectively, in which communication through a default gateway and communication in the static route are performed independently from each other by the printer.

DETAILED DESCRIPTION OF THE INVENTION

This application claims priority to Japanese Patent Application No. 2017-147865 filed on Jul. 31, 2017, the entirety of which is hereby incorporated by reference in its entirety.

In the present disclosure, "LAN (Local Area Network)" may be any size of network as long as it is a network (subnetwork) uniquely defined by a network address. The LAN may be a wired network, or alternatively, may be a wireless network. When made in the form of wireless network, the LAN complies with, for instance, a standard such as IEEE802a/b/g/j/n/ac/ad.

In the present disclosure, "first and second gateways" are nodes that relay communication when a printer performs communication with another device across a LAN to which the printer is connected. Besides, "first and second gateways" may be realized by physical devices such as routers, servers, etc., or alternatively, may be realized by software.

In the present disclosure, "mobile communication network" is not particularly limited in specification, and is not limited in particular as long as it complies with a wireless communication system that is being operated or is planted to be operated by a mobile network operator. The following can be exemplified as such a wireless communication system: a wireless communication system complying with a standard IMT-2000, so-called 3G; a wireless communication system complying with a standard IMT-Advanced, so-called 4G; and a wireless communication system, so-called 5G, standardization of which has been in progress in 3GPP (Third Generation Partnership Project).

In the present disclosure, "first device" may be any type of device as long as it is a device connected to the mobile communication network. For example, "first device" is a device accessible to the mobile communication network such as a computer device, a server, etc. In the present disclosure, "second device" may be any type of device as long as it is a device connected to the LAN. For example, a computer device, a smart phone, a tablet terminal, etc. can be exemplified as "second device."

(1) Configuration of Communication System

Figure 1:
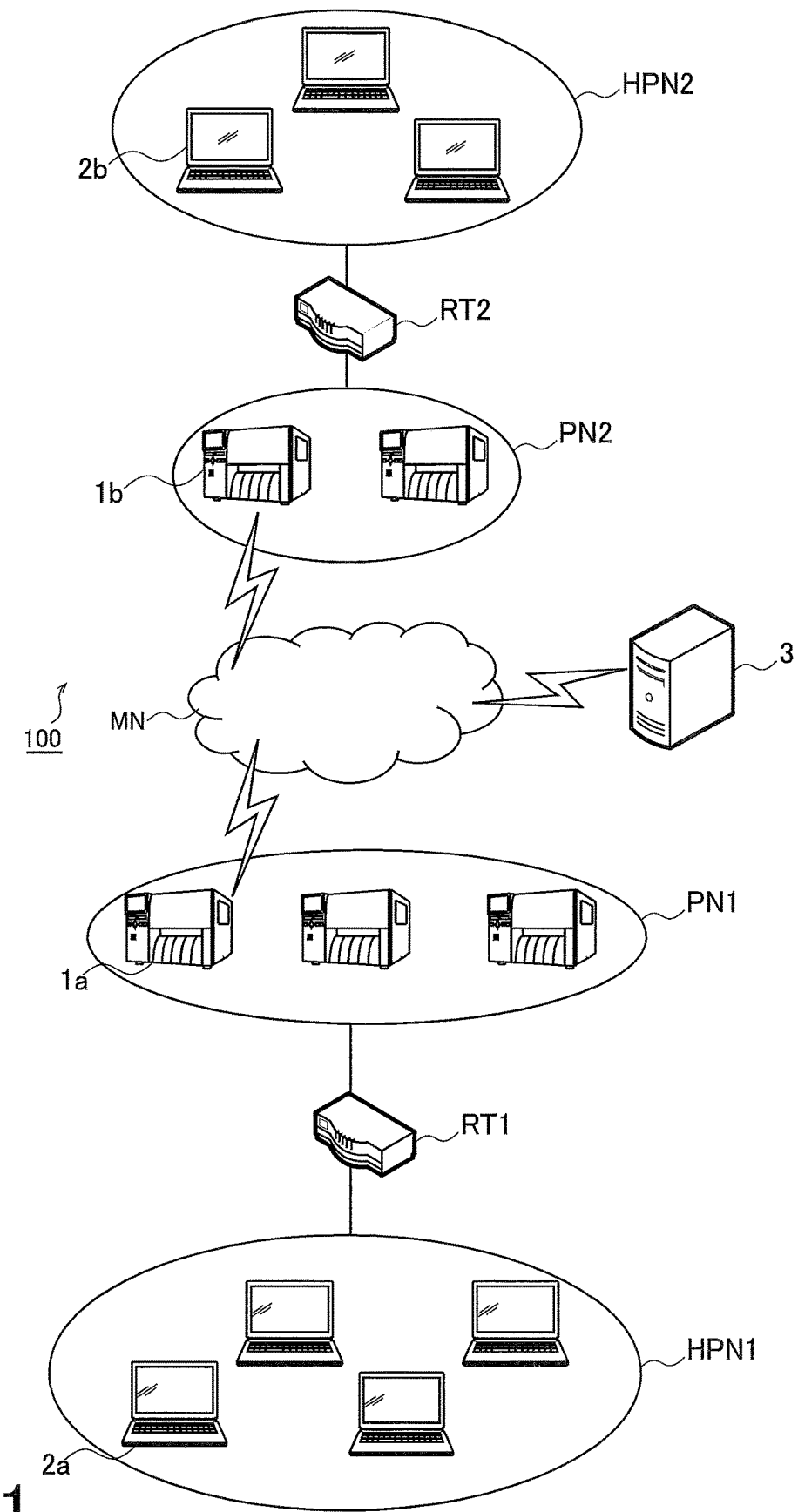
FIG. 1 is a diagram showing an example of a configuration of a communication system according to an embodiment.

First, a configuration of a communication system 100 according to the present embodiment will be explained with reference to FIG. 1. FIG. 1 is a diagram showing an example of a configuration of the communication system 100 according to the present embodiment.

In FIG. 1, printers 1a are included in a printer network PN1; printers 1b are included in a printer network PN2; host personal computers (PCs) 2a are included in a host PC network HPN1; and host PCs 2b are included in a host personal computer (PC) network HPN2. A router RT1 is provided as a gateway of the printer network PN1, whereas a router RT2 is provided as a gateway of the printer network PN2. Each router is an example of a communication device.

Each host PC is an example of a second device. Each host PC network may be a wired LAN, or alternatively, may be a wireless LAN.

The printers 1a and 1b and a server 3 are each capable of using a mobile communication network MN. The server 3 is an example of a first device.

The printers 1a and 1b and the server 3 are each configured to enable a SIM (Subscriber Identity Module) card to be attached thereto in order to use a mobile communication service provided by a telecommunication carrier.

FIG. 1 shows a configuration that two printer networks are provided and one host PC network is connected to each printer network through one router. However, this is exemplary only. The number of printer networks and the number of host PC networks to which each printer network is connectable are arbitrarily settable. Additionally, each printer network may be provided with two or more routers as gateways thereof.

It should be noted that in the following explanation, the term "printer 1" will be used on an as-needed basis in describing matters common to the printers 1a and 1b. The term "host PC2" will be used on an as-needed basis in describing matters common to the host PCs 2a and 2b. The term "host PC network HPN" will be used on an as-needed basis in describing matters common to the host PC networks HPN1 and HPN2. The term "printer network PN" will be used on an as-needed basis in describing matters common to the printer networks PN1 and PN2.

(2) Configurations of Respective Devices Included in Communication system 100

Figure 2:
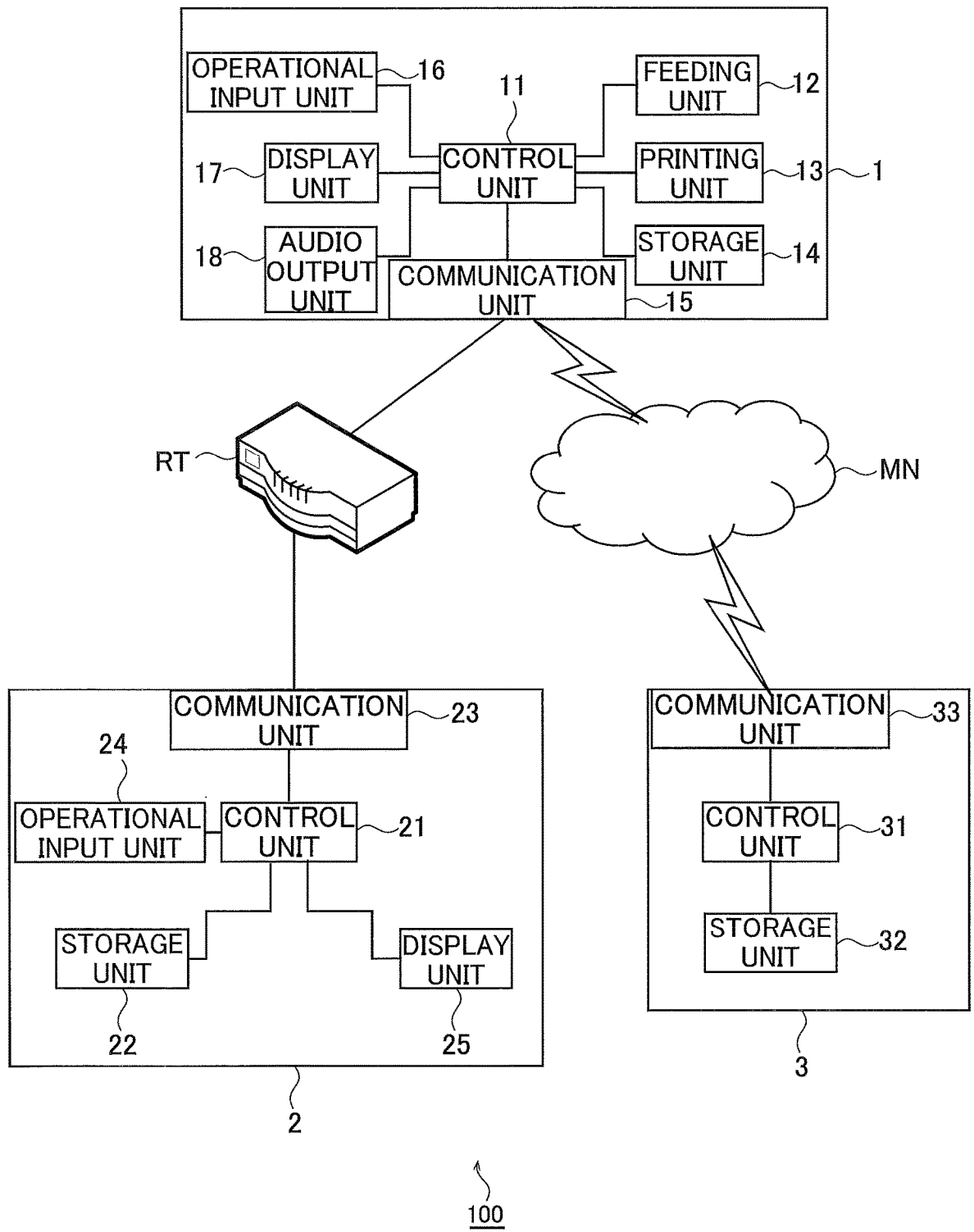
FIG. 2 is a block diagram of a printer, a host PC and a server according to the embodiment.

Next, configurations of the respective devices included in the communication system 100 shown in FIG. 1 will be explained with reference to FIG. 2. FIG. 2 is a block diagram of the printer 1, the host PC 2 and the server 3 according to the present embodiment.

(2-1) Printer 1

As shown in FIG. 2, the printer 1 includes a control unit 11, a feeding unit 12, a printing unit 13, a storage unit 14, a communication unit 15, an operational input unit 16, a display unit 17 and an audio output unit 18. The communication unit 15 performs communication with, for instance, the host PC 2. For example, a paper roll, formed by winding a continuous paper, is contained in the printer 1. The continuous paper includes a paper mount and a plurality of labels temporarily adhered onto the paper mount.

The printer 1 may be a stationary printer, or alternatively, may be a portable printer.

The control unit 11 is mainly composed of a microprocessor, and controls the entirety of the printer 1. For example, the microprocessor included in the control unit 11 realizes a variety of functions by loading and executing firmware stored in the storage unit 14. For example, the control unit 11 performs generation of printing data based on a printing request transmitted thereto from the host PC 2, control of the feeding unit 12 and the printing unit 13 for the purpose of printing, and so forth. The printing request contains printing information.

The storage unit 14 is a non-volatile memory, and may be an SSD (Solid State Drive) such as a flash memory, etc. The storage unit 14 stores, aside from the aforementioned firmware, a variety of formats of data compatible with the printing information to be obtained from the host PC 2.

The feeding unit 12 includes a platen roller, a motor drive circuit and a stepping motor, which are not shown in the drawings, and performs feeding of the continuous paper inside the printer 1. For example, based on a feeding request by the control unit 11, the motor drive circuit drives the stepping motor that controls rotation of the platen roller, whereby feeding of the continuous paper is performed.

When performing printing on a label based on the printing information, the control unit 11 retrieves data, having a format compatible with the printing information, from the storage unit 14. The control unit 11 generates printing data by embedding character information contained in the printing information and/or a bar code into the retrieved data, and sequentially transmits data sets of respective lines of the printing data, i.e., line data, to the printing unit 13.

The printing unit 13 includes a thermal head and a head drive circuit, both of which are not shown in the drawings. The thermal head sandwiches the continuous paper together with the aforementioned platen roller therebetween. The head drive circuit performs printing by electrifying or not electrifying respective heating elements of the thermal head (by causing or not causing respective heating elements of the thermal head to generate heat) based on the line data sequentially transmitted by the control unit 11.

The printer 1 is provided with, for instance, a cutter, albeit this is not shown in the drawings. After label printing, the cutter cuts the continuous paper on a label basis. It should be noted that printed labels may be configured to be peeled from the paper mount.

The communication unit 15 includes a communication circuit for connection with the mobile communication network MN, an antenna, and a slot into which a SIM card (not shown in the drawings) is insertable. In other words, the SIM card is attachable to the printer 1 according to the present embodiment.

The SIM card is an example of a user identification module that stores a user ID for managing usage of a mobile communication network on a user basis. A universal subscriber identity module (UIM) can be exemplified as another example of the user identification module. The user ID is an example of user identification information, and is user-specifiable information, for instance, a telephone number, a subscriber number, etc.

When the SIM card has been inserted into the slot, the communication unit 15 obtains the user ID stored in the SIM card, and accesses a default gateway (a first gateway). The default gateway performs user authentication based on the user ID. When usage by a user is permitted, the communication unit 15 accesses the server 3 connected to the mobile communication network MN through the default gateway, and performs communication with the accessed server 3. In the example of the present embodiment, software performs setting of the default gateway for accessing the mobile communication network MN.

Additionally, albeit this will be described below, when the default gateway is set to access the mobile communication network MN, the control unit 11 is capable of setting a static route for performing communication with the host PC 2 connected to the host PC network HPN based on an input operation performed by the user. When the static route has been set, the control unit 11 performs control such that communication with the server 3 through the default gateway and communication with the host PC 2 in the static route are performed independently from each other.

For example, the control unit 11 can be triggered to control the display unit 17 to display a screen for setting the static route by either reception of a predetermined input operation from the user or insertion of the SIM card into the slot (i.e., when the SIM card has been connected). The static route is set based on a user input regarding an IP address of a network in which the host PC 2 as a recipient is included ("access point IP address" to be described) and a user input regarding an IP address of a router to be set as a static gateway (an example of a second gateway). Setting information of the static route is stored in the storage unit 14.

Each IP address is an example of address information.

The communication unit 15 includes an Ethernet (registered trademark) cable connector and a communication circuit for performing Ethernet (registered trademark) communication with the router RT and another printer 1 in the printer network PN to which the printer 1 belongs.

The communication unit 15 periodically transmits printer status information exemplified below to the server 3 so as to be provided with a predetermined service or services by the server 3. Transmission timing is not particularly limited, but for instance, is set to predetermined timing of 10-30 minute intervals (e.g., 15 minute intervals).

[Examples of Printer Status Information]

Total travel distance (rotational distance) of the platen roller

Frequency of cutting

Operating time of the printer

Number of label issuance

When an error event occurs, the communication unit 15 transmits error information to the host PC 2 and the server 3. The error information contains, for instance, information for specifying at least any of error types exemplified below.

[Examples of Error Types]

Ribbon error . . . where no ink ribbon has been set or where an ink ribbon has been damaged or broken Printer overheating . . . where printer temperature has exceeded an allowable value Machine error . . . where a board is defective Printing head error . . . where the thermal head has not been completely attached yet Cutter error . . . where paper gets stuck in a cutter unit or where a cutter blade is not in place Paper Jamming . . . where labels have been wound about the platen roller or where labels have not been set correctly When an event of changing the setting of the printer 1 occurs, the communication unit 15 transmits setting change information to the host PC 2 and the server 3. The setting change information contains, for instance, information for specifying at least any of change contents exemplified below.

[Examples of Setting]

Feeding speed

Printing density

Sensor type (e.g., which of a reflective sensor and a transmission sensor is used for detecting a label position on the continuous paper)

(2-2) Host PC 2

As shown in FIG. 2, the host PC 2 includes a control unit 21, a storage unit 22, a communication unit 23, an operational input unit 24 and a display unit 25. The communication unit 23 performs communication with the printer 1.

The control unit 21 is mainly composed of a microprocessor, and controls the entirety of the host PC 2. For example, the microprocessor included in the control unit 21 loads and executes a printer driver stored in the storage unit 22.

The storage unit 22 is a non-volatile memory, and may be an SSD such as a flash memory, etc. The storage unit 22 stores, aside from the printer driver, a variety of application programs. The control unit 21 retrieves, from the storage unit 22, an application program specified in response to a predetermined operational input performed by the user with respect to the operational input unit 24, and executes the retrieved program.

The display unit 25 includes, for instance, a liquid crystal display panel having a touch input function, and displays a result of execution of the aforementioned application program. In this case, the touch input function of the display unit 25 composes part of the operational input unit 24.

The communication unit 23 performs communication with the printer 1 under the control by the control unit 21. For example, when the control unit 21 receives a printing instruction from the user through the operational input unit 24 during execution of the application program, the communication unit 23 transmits a printing request to the printer 1 under the control by the control unit 21.

The communication unit 23 includes an Ethernet (registered trademark) cable connector and a communication circuit for performing Ethernet (registered trademark) communication with the router RT and with another host PC 2 in the host PC network HPN to which the host PC 2 belongs.

(2-3) Server 3

The server 3 is configured to perform communication with the respective printers 1 included in the printer networks PN1 and PN2 and provide a predetermined service or services to the respective printers 1. The server 3 provides services exemplified below when receiving the aforementioned printer status information, error information and setting change information from the printer 1.

[Examples of Services to Be Provided]

Informing the host PC or an administrator PC (not shown in the drawings) of an operating status and a load status of each printer 1

Sending the host PC or the administrator PC a notice to encourage replacement of an expendable component, if necessary, depending on a usage status of each printer 1

Sending the administrator PC a notice of error in occurrence of an error in each printer 1

As shown in FIG. 2, the server 3 includes a control unit 31, a storage unit 32 and a communication unit 33. The communication unit 33 performs communication with the printer 1. In the server 3, the control unit 31 executes a management program, and executes a variety of processes for realizing provision of the aforementioned services. In provision of the services, the server 3 receives underlying information for the services from the respective printers 1 in the printer network. The underlying information for the services includes at least any of the printer status information, the error information and the setting change information.

(3) Method of Setting Static Route in Printer

The printer 1 of the present embodiment is set so that the default gateway communicates with the server 3 through the mobile communication network MN in the condition that the SIM card has been inserted. In view of the above, the printer 1 is configured to enable the user to set the static route so as to be capable of communicating with the host PC 2 even during communication through the mobile communication network MN.

Figure 3:
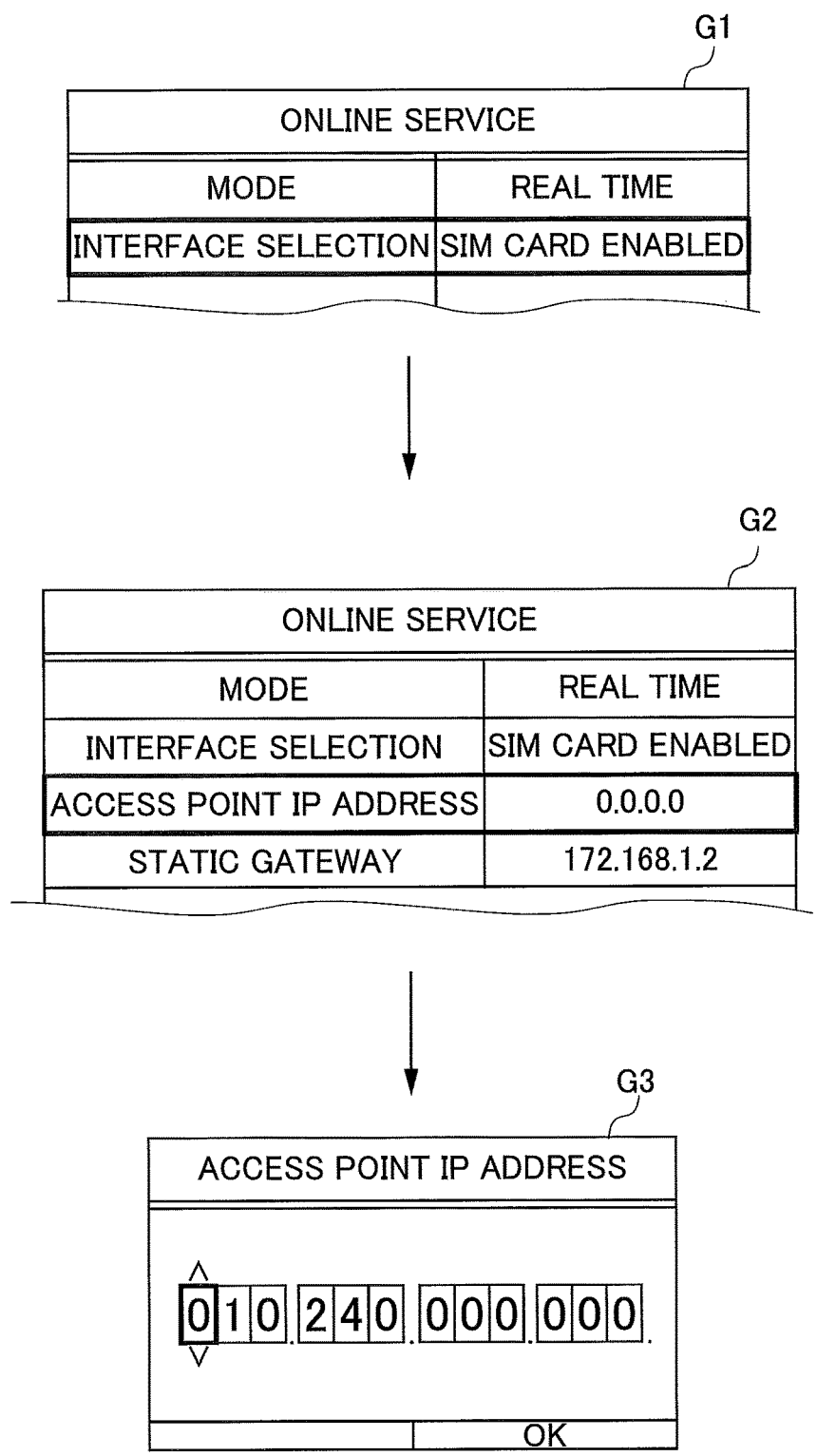
FIG. 3 is a diagram showing an example of change in screen on a display panel of the printer according to the embodiment.

A method of setting the static route in the printer 1 will be explained with reference to FIGS. 3 and 4. FIGS. 3 and 4 are diagrams that show examples of change in screen on the display panel of the display unit 17 of the printer 1 according to the present embodiment, respectively.

Static route settings shown in FIGS. 3 and 4 are performed by execution of the firmware in the printer 1.

In a screen G1 of FIG. 3, "real time" is set as a mode of the printer 1. This is a mode used in establishing network connection to the server 3. As shown in the screen G1 of FIG. 3, an item "interface selection" is provided on the display panel of the printer 1, and displays whether a SIM card is enabled or disabled. When a SIM card has been inserted into the slot, "SIM card enabled" is displayed. When no SIM card is inserted into the slot, "SIM card disabled" is displayed.

In an example of the present embodiment, when "SIM card disabled" is displayed as the setting of the item "interface selection", the user attaches a SIM card to the slot, and thereafter, performs an input operation of tapping a part in which the item "interface selection" is displayed so as to switch the displayed setting into "SIM card enabled". Thereafter, items "access point IP address" and "static gateway" appear as shown in a screen G2. This is triggered when the user taps a row in which the item "interface selection" is displayed in the screen G1 (an example of performance of a predetermined input operation by a user). In short, when recognizing the aforementioned tapping operation by the user, the control unit 11 of the printer 1 is capable of controlling the display unit 17 to display the screen for setting the items "access point IP address" and "static gateway." This enables the user to immediately start setting the static route.

It should be noted that when a SIM card is attached to the slot while "SIM card disabled" is displayed as the setting of the item "interface selection", the printer 1 may be configured to automatically change the displayed setting from "SIM card disabled" to "SIM card enabled".

Here, "access point IP address" is an IP address of the host PC network HPN including a recipient of data to be transmitted from the printer 1 in the static route. "Static gateway" is an IP address of a printer network PN-side port of the router functioning as the gateway when data is transmitted from the printer 1 to the host PC 2 in the static route. The static route is specified by "access point IP address" and "static gateway."

In setting "access point IP address", when a tapping operation is performed with respect to "access point IP address" in the screen G2, a screen for inputting or changing a decimal number value of the access point IP address on a digit-by-digit basis is displayed as shown in a screen G3. When the user inputs the access point IP address and then taps "OK", the access point IP address is set.

When "OK" is tapped in the screen G3, a screen G4 is displayed. The screen G4 is a screen having the same display content as the screen G2. When a tapping operation is performed with respect to "static gateway" in the screen G4, a screen for inputting or changing a decimal number value of the IP address of the static gateway on a digit-by-digit basis is displayed as shown in the screen G54. When the user inputs the IP address of the static gateway and then taps "OK", the static gateway is set.

It should be noted that as a modification, displaying the item "SIM card enabled" shown in the screen G1 and the items "access point IP address" and "static gateway" shown in the screen G2 may be configured to be triggered by insertion of the SIM card into the slot during operation of the printer 1 (i.e., attachment of the SIM card to the printer 1). A subsequent procedure for inputting "access point IP address" and "static gateway" is the same as the aforementioned procedure in recognition of the tapping operation performed by the user.

Figure 5A:
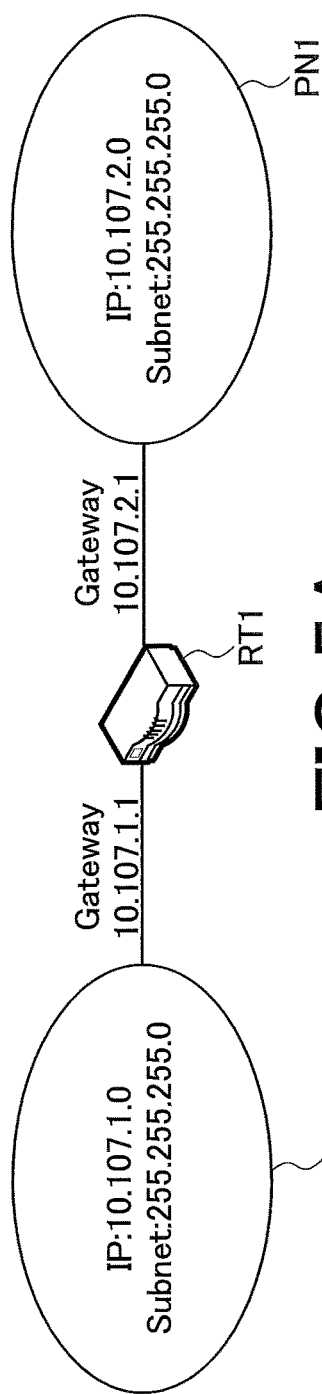
FIG. 5 is composed of FIGS. 5A and 5B that explain examples of a setting of a static route in the printer, respectively.
Figure 5B:
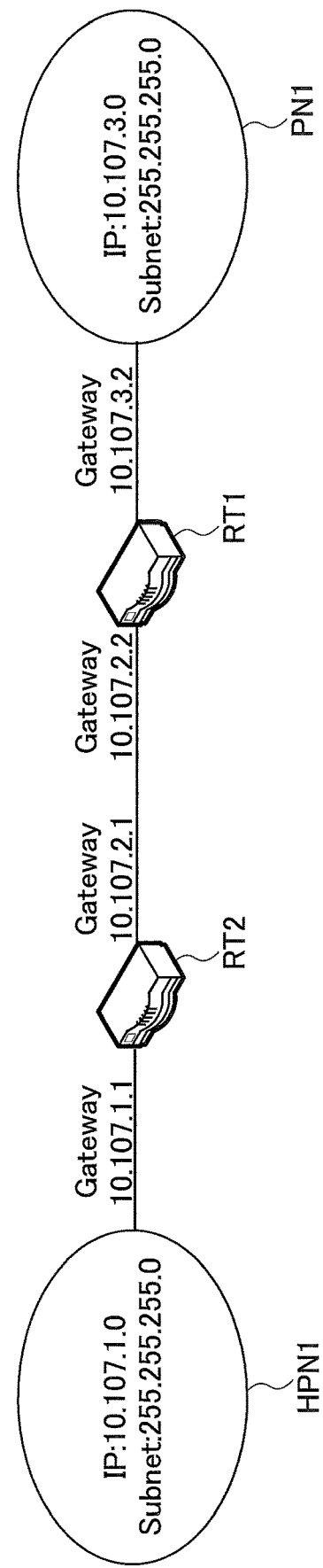

Next, examples of setting the static route will be explained with reference to FIGS. 5A and 5B. FIGS. 5A and 5B are diagrams that explain examples of setting the static route in the printer 1, respectively.

FIG. 5A exemplifies a configuration that the printer network PN1 and the host PC network HPN1 are connected through one router RT1.

The example shown in FIG. 5A assumes setting the static route in which the printer 1 connected to the printer network PN1 performs communication with the host PC network HPN1. For example, it is herein assumed that the printer network PN1 has a network IP address of "10.107.2.0" whereas the host PC network HPN1, to which the host PC 2 as a recipient is connected, has a network IP address of "10.107.1.0". At this time, the access point IP address and the static gateway to be inputted in the screen G3 (FIG. 3) and the screen G5 (see FIG. 4) are as follows.

Destination IP address: 10.107.1.0
Static gateway: 10.107.2.1

The static gateway is herein the IP address of the printer network PN1-side port of the router RT1.

It should be noted that a subnet mask may use a value that has been preset on the host PC network HPN1 side. In this case, the subnet mask is set as follows.

Subnet mask: 255.255.255.0

FIG. 5B exemplifies a configuration that the printer network PN1 and the host PC network HPN1 are connected through two routers RT1 and RT2.

The example shown in FIG. 5B assumes setting the static route in which the printer 1 connected to the printer network PN1 performs communication with the host PC network HPN1. For example, it is herein assumed that the printer network PN1 has a network IP address of "10.107.3.0" whereas the host PC network HPN1, to which the host PC 2 as a recipient is connected, has a network IP address of "10.107.1.0". At this time, the access point IP address and the static gateway to be inputted in the screen G3 (FIG. 3) and the screen G5 (see FIG. 4) are as follows.

Destination IP address: 10.107.1.0
Static gateway: 10.107.3.2

The static gateway is herein the IP address of the printer network PN1-side port of the router RT1.

It should be noted that a subnet mask may use a value that has been preset on the host PC network HPN1 side. In this case, the subnet mask is set as follows.

Subnet mask: 255.255.255.0

Regardless of the number of networks via which communication is performed between the printer network PN1 and the host PC network HPN1, setting similar to the above may be performed. In other words, the static gateway herein set in the printer 1 is the router RT1 as the gateway of the printer network PN1 to which the printer 1 is connected, i.e., the IP address of the printer network PN1-side port of the router RT1.

(4) Communication Control in Printer 1

Next, communication control to be performed in the printer 1 according to the present embodiment will be explained with reference to FIGS. 6 and 7.

Figure 6:
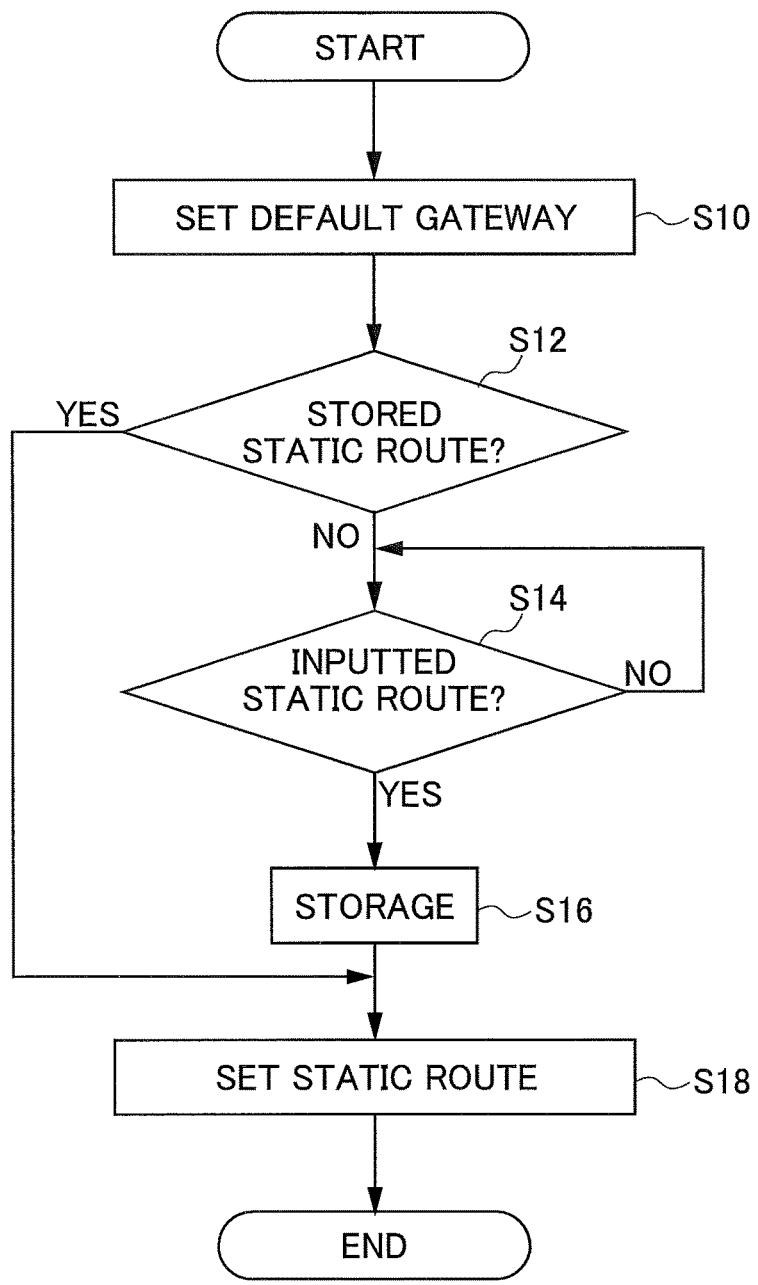
FIG. 6 is a flowchart of a gateway setting process to be executed in the printer according to the embodiment.

FIG. 6 is a flowchart of a gateway setting process to be executed in the printer 1 according to the present embodiment. FIG. 7 is a flowchart of a data transmission process to be executed in the printer 1 according to the present embodiment. The processes of FIG. 6 and FIG. 7 are executed in execution of the firmware by the control unit 11 of the printer 1.

In FIG. 6, when the printer 1 is activated, the control unit 11 sets a default gateway for transmitting data (packets) from the communication unit 15 (step S10). When herein determining that a SIM card has been inserted into the slot, the control unit 11 sets the default gateway to be connected to the mobile communication network MN. When determining that no SIM card has been inserted into the slot, the control unit 11 sets a preset default gateway of the printer network PN as the default gateway. For example, regarding the printer 1 connected to the printer network PN1 in FIG. 5A, the default gateway, which has been preset in the control unit 11 of this printer 1, is the router RT1, i.e., the IP address of the printer network PN1-side port of the router RT1.

Next, the control unit 11 refers to the storage unit 14 and determines whether or not a static route has been stored therein (step S12). When a static route has been stored therein (step S12: YES), the stored static route is determined as the setting of static route (step S18), and the process of the present flowchart ends. When no static route has been stored therein, a standby state remains until a static route is inputted (step S14: NO). Then, when the user has inputted a static route as shown in the screens G2 to G5 of FIGS. 3 and 4 (step S14: YES), the control unit 11 stores the inputted static route, i.e., the access point IP address and the static gateway, in the storage unit 14 (step S16), and sets the static route based on the inputted access point IP address and static gateway (step S18).

Figure 7:
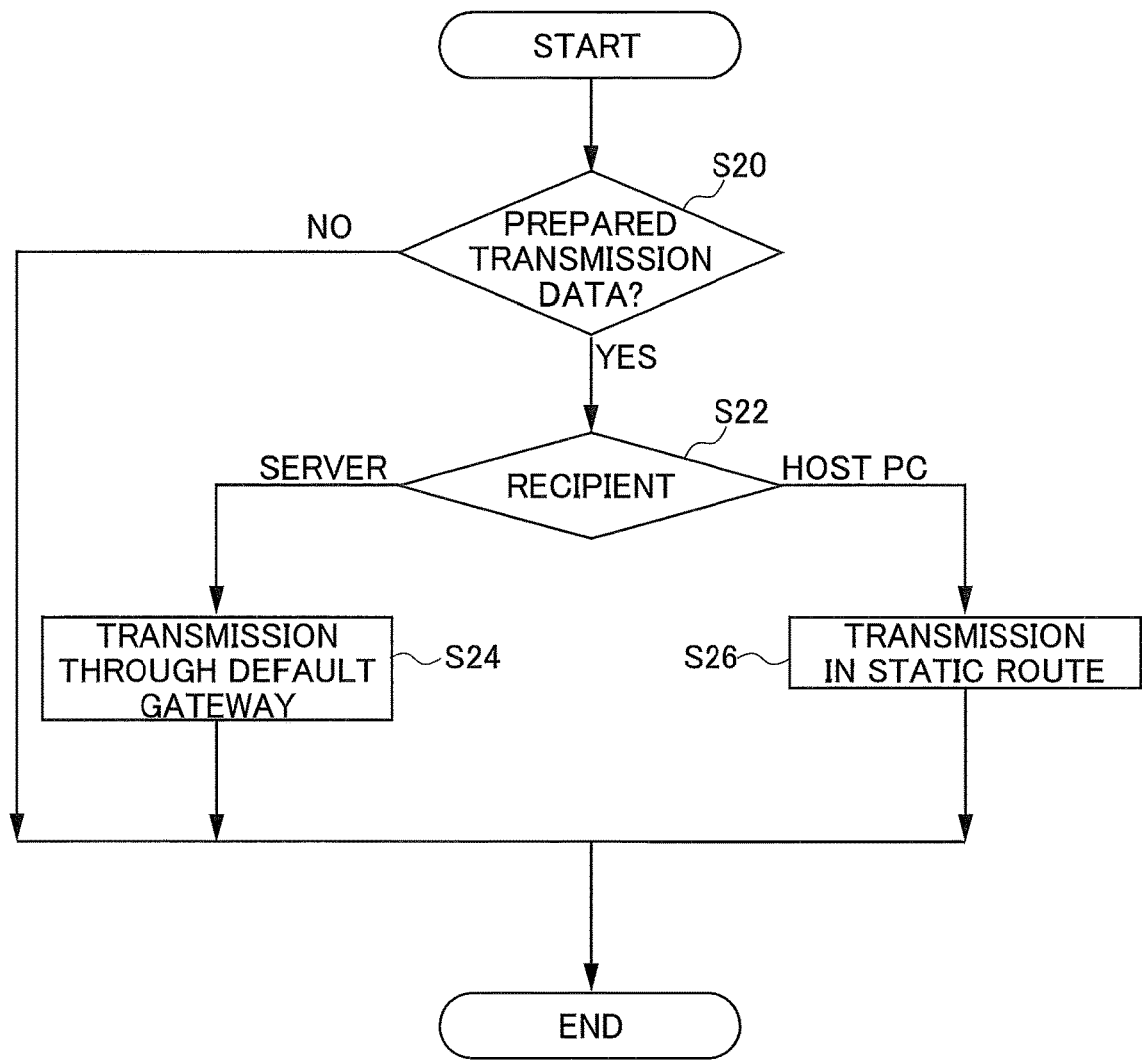
FIG. 7 is a flowchart of a data transmission process to be executed in the printer according to the embodiment.

When the printer 1 transmits data (packets), the control unit 11 of the printer 1 changes a communication route based on a destination (recipient) of data As shown in FIG. 7, when data to be transmitted is prepared (step 20: YES), and besides, the recipient of the data is the server 3, the control unit 11 controls the communication unit 15 such that the data can be transmitted through the default gateway (step S24). At this time, when no SIM card has been inserted yet, the IP address of the router as the gateway of the printer network PN to which the printer 1 is connected is set as the default gateway. Hence, the data cannot be transmitted to the server 3.

On the other hand, when the recipient of the data to be transmitted is the host PC, the control unit 11 controls the communication unit 15 such that the data can be transmitted in the static route set in step S18 of FIG. 6 (step S26).

(5) Examples of Data Transmission

As described above, the printer 1 of the communication system 100 of the present embodiment sets the default gateway so as to perform communication with the server 3 via the mobile communication network MN and perform communication with the host PC 2 in the static route. Moreover, the communication in the static route and the communication through the default gateway are controlled to be performed independently from each other.

An example of a configuration for simultaneously performing the communication in the static route and the communication through the default gateway will be hereinafter explained with reference to FIGS. 8A and 8B.

FIG. 8A exemplifies a configuration that the communication unit 15 of the printer 1 transmits a printing status to the host PC 2 in the static route, and simultaneously, transmits printer status information to the server 3 through the default gateway.

As described above, the printer 1 is programmed to transmit the printer status information to the server 3 at predetermined time intervals. On the other hand, the printing request is transmitted from the host PC 2 to the printer 1 at given clock time based on an instruction of the user of the host PC 2, and the printer 1 transmits the printing status in response to the printing request. Because of this, chances could be that transmitting the printing status to the host PC 2 and transmitting the printer status information to the server 3 are performed at the same timing, albeit this depends on the timing of receiving the printing request from the host PC 2.

The printing status is information for indicating a status of the printer 1 made in response to the printing request (e.g., ongoing printing, ongoing label peeling, etc.), and is an example of printing related information.

FIG. 8B exemplifies a configuration that the communication unit 15 of the printer 1 transmits error information and/or setting change information to the host PC 2 in the static route and transmits the error information and/or setting change information to the server 3 through the default gateway. The error information and/or setting change information have been already exemplified above.

When at least any of events including change in setting of the printer 1 and an error of the printer 1 occurs in the printer 1, the communication unit 15 of the printer 1 transmits the error information and/or setting change information simultaneously to the host PC 2 and the server 3 as event information related to the occurred event. In other words, chances are that transmitting the event information to the host PC 2 and transmitting the event information to the server 3 are performed at the same timing.

Conventionally, one default gateway has been set in a printer, and setting a static route has not been assumed in situations except for occurrence of a line or device failure. By contrast, in the printer 1 according to the present embodiment, the static route, aside from the default gateway, is settable at desired timing, and communication through the default gateway and communication in the static route are enabled to be performed independently from each other. Because of this, even when the default gateway is occupied to perform communication with the mobile communication network MN, data can be transmitted to the host PC 2 in the static route as exemplified in FIGS. 8A and 8B.

One embodiment of the printer, the program and the communication system according to the present invention has been explained above in detail. However, the present invention is not limited to the aforementioned embodiment. Additionally, a variety of improvements and changes can be made for the aforementioned embodiment without departing from the gist of the present invention.

For example, the aforementioned embodiment has explained the configuration of setting one static route (i.e., one static gateway) for performing communication with the host PC connected to the printer network. However, static route setting is not limited to this. A plurality of static routes may be set for the printer. For example, when a single router is limited in number of printers connectable thereto, a plurality of routers may be provided as gateways for a single printer network and a plurality of static routes may be set. In this case, depending on the degrees of congestion in the respective routers, the printer may be configured to be capable of selecting a static route used for data transmission to the host PC among the plurality of static routes.

REFERENCE SIGNS LIST

100 . . . Communication System
1 (1a, 1b) . . . Printer
11 . . . Control unit
12 . . . Feeding unit
13 . . . Printing unit
14 . . . Storage unit
15 . . . Communication unit
16 . . . Operational input unit
17 . . . Display unit
18 . . . Audio output unit
2 (2a, 2b) . . . Host PC
21 . . . Control unit
22 . . . Storage unit
23 . . . Communication unit
24 . . . Operational input unit
25 . . . Display unit
3 . . . Server
31 . . . Control unit
32 . . . Storage unit
33 . . . Communication unit
HPN (HPN1, HPN2) . . . Host PC network
PN (PN1, PN2) . . . Printer network
RT (RT1, RT2) . . . Router
MN . . . Mobile communication network

The invention claimed is:

1. A printer comprising:
a communication circuit configured to perform communication based on a first gateway and a second gateway; and
a processor configured to control the communication circuit to perform the communication through the first gateway in communication with a first device connected to a mobile communication network and to perform the communication through the second gateway in communication with a second device connected to a local area network (LAN), wherein
the processor is configured to control the communication circuit such that the communication with the first device and the communication with the second device are performed independently from each other.

2. The printer according to claim 1, wherein the communication circuit is configured to transmit printing related information to the second device in response to a printing request from the second device and transmit status information of the printer to the first device at predetermined timing.

3. The printer according to claim 2, wherein in occurrence of at least any of events including change in setting of the printer and an error of the printer, the communication circuit is configured to transmit event information related to the at least any of events to the first device and the second device.

4. The printer according to claim 3, further comprising a user identification module detachably attachable to the printer, the user identification module storing user identification information for managing usage of the mobile communication network on a user basis,
wherein, when the user identification module has been attached to the printer, the communication circuit is configured to refer to the user identification information stored in the user identification module and access the mobile communication network.

5. The printer according to claim 2, wherein the processor is configured to obtain address information of the second gateway based on an input operation performed by a user and set the second gateway based on the obtained address information.

6. The printer according to claim 5, further comprising a user identification module detachably attachable to the printer, the user identification module storing user identification information for managing usage of the mobile communication network on a user basis,
wherein, when the user identification module has been attached to the printer, the communication circuit is configured to refer to the user identification information stored in the user identification module and access the mobile communication network.

7. The printer according to claim 2, further comprising a user identification module detachably attachable to the printer, the user identification module storing user identification information for managing usage of the mobile communication network on a user basis,
wherein, when the user identification module has been attached to the printer, the communication circuit is configured to refer to the user identification information stored in the user identification module and access the mobile communication network.

8. The printer according to claim 1, wherein in occurrence of at least any of events including change in setting of the printer and an error of the printer, the communication circuit is configured to transmit event information related to the at least any of events to the first device and the second device.

9. The printer according to claim 8, wherein the processor is configured to obtain address information of the second gateway based on an input operation performed by a user and set the second gateway based on the obtained address information.

10. The printer according to claim 9, further comprising a user identification module detachably attachable to the printer, the user identification module storing user identification information for managing usage of the mobile communication network on a user basis,
wherein, when the user identification module has been attached to the printer, the communication circuit is configured to refer to the user identification information stored in the user identification module and access the mobile communication network.

11. The printer according to claim 1, wherein the processor is configured to obtain address information of the second gateway based on an input operation performed by a user and set the second gateway based on the obtained address information.

12. The printer according to claim 1, further comprising a user identification module detachably attachable to the printer, the user identification module storing user identification information for managing usage of the mobile communication network on a user basis,
wherein, when the user identification module has been attached to the printer, the communication circuit is configured to refer to the user identification information stored in the user identification module and access the mobile communication network.

13. The printer according to claim 12, wherein the processor is triggered to control a display unit to display a screen for setting address information of the second gateway by reception of a predetermined input operation performed by a user or by attachment of the user identification module to the printer.

14. The printer according to claim 1, wherein the second gateway is one of a plurality of second gateways set for the communication circuit to perform the communication with the second device connected to the LAN.

15. A non-transitory computer-readable recording medium having a program stored therein, the program configured to cause a computer to perform a method for controlling communication of a printer, the method comprising:
 setting a first gateway;
 obtaining address information based on an input operation performed by a user;
 setting a second gateway based on the obtained address information; and
 controlling the communication so as to be performed through the first gateway in communication with a first device connected to a mobile communication network and for controlling the communication so as to be performed through the second gateway in communication with a second device connected to a local area network (LAN),
 wherein the controlling controls the communication with the first device and the communication with the second device to be performed independently from each other.

16. A communication system comprising:
 a first device connected to a mobile communication network;
 a second device connected to a local area network (LAN); and
 a printer configured to perform communication with at least either of the first device and the second device,
 wherein the printer includes:
 a communication circuit configured to perform the communication based on a first gateway and a second gateway, and
 a processor configured to control the communication circuit to perform the communication through the first gateway in communication with the first device and to perform the communication through the second gateway in communication with the second device, the processor controlling the communication circuit such that the communication with the first device and the communication with the second device are performed independently from each other.

* * * * *